United States Patent
Rauch

(10) Patent No.: US 6,560,953 B2
(45) Date of Patent: May 13, 2003

(54) AGRICULTURAL HARVESTING MACHINE FRONT ATTACHMENT ADAPTING DEVICE

(75) Inventor: Hans Rauch, Bad Saulgau (DE)

(73) Assignee: Claas Saulgau GmbH, Saulgau (GB)

( * ) Notice: Subject to any disclaimer, the term of this patent is extended or adjusted under 35 U.S.C. 154(b) by 0 days.

(21) Appl. No.: 09/891,973

(22) Filed: Jun. 26, 2001

(65) Prior Publication Data

US 2001/0054278 A1 Dec. 27, 2001

(30) Foreign Application Priority Data

Jun. 27, 2000 (DE) .......................... 100 30 330

(51) Int. Cl.⁷ .............................................. A01D 45/02
(52) U.S. Cl. ........................................... 56/64; 56/11.2
(58) Field of Search .......................... 56/64, 11.2, 10.2, 56/10.2 R, 502, 504, 505, DIG. 1, DIG. 6, DIG. 15, DIG. 22, 14.7, 14.9; 460/1, 2, 3

(56) References Cited

U.S. PATENT DOCUMENTS

| | | | | |
|---|---|---|---|---|
| 3,306,014 A | * | 2/1967 | Halls et al. .................... | 56/15.8 |
| 3,589,115 A | * | 6/1971 | Taylor et al. .................. | 56/208 |
| 3,731,470 A | * | 5/1973 | Cornish et al. ............... | 56/10.4 |
| 4,085,571 A | * | 4/1978 | Mortier et al. ................ | 56/208 |
| RE30,056 E | * | 7/1979 | Halls ............................. | 56/208 |
| 4,280,317 A | * | 7/1981 | Lindblom et al. ............ | 56/15.6 |
| 4,300,726 A | * | 11/1981 | Phillips, II et al. ... | 241/101.742 |
| 4,313,294 A | * | 2/1982 | Martenas ..................... | 56/15.8 |
| 4,707,972 A | * | 11/1987 | Knepper .................. | 56/10.2 R |
| 4,724,661 A | * | 2/1988 | Blakeslee et al. ............. | 56/208 |
| 4,742,671 A | * | 5/1988 | Bich ........................... | 56/15.9 |
| 5,651,243 A | | 7/1997 | Arnold et al. | |
| 5,832,707 A | | 11/1998 | Arnold et al. | |
| 5,862,656 A | * | 1/1999 | Gernert ....................... | 56/105 |
| 6,119,443 A | | 9/2000 | Rauch | |
| 6,318,056 B1 | * | 11/2001 | Rauch et al. ............. | 56/10.2 J |
| 6,318,057 B1 | * | 11/2001 | Bürmann ................. | 56/10.2 R |

FOREIGN PATENT DOCUMENTS

| | | | |
|---|---|---|---|
| DE | 198 47 891 | 4/2000 | |
| EP | 401542 A1 | * 12/1990 | ........ A01D/89/00 |

* cited by examiner

*Primary Examiner*—Robert E. Pezzuto
*Assistant Examiner*—Árpád Fábián Kovács
(74) *Attorney, Agent, or Firm*—Husch & Eppenberger, LLC; Robert E. Muir; David A. Chambers

(57) ABSTRACT

A harvester at least one adapting device for receiving a front attachment, wherein a mechanically and/or hydraulically switchable reversing device is associated with at least one of the working components of the agricultural harvesting machine which are at the front in the direction of travel and the front attachment, which is received by the adapting device, can be moved by at least one displacement device into at least one non-working position which is at a distance from the working components of the agricultural harvesting machine, and which forms a gap for passage of crop between the front attachment and these working components. In this way, in the non-working position a through-gap is created between the front attachment and the working components of the harvesting machine, through which the crop stream conveyed out of the agricultural harvesting machine during the reversing process and interspersed with one or more foreign bodies can flow down in the direction of the ground.

26 Claims, 4 Drawing Sheets

AGRICULTURAL HARVESTING MACHINE FRONT ATTACHMENT ADAPTING DEVICE

BACKGROUND OF THE INVENTION

The present invention relates generally to agricultural machinery and, more particularly, to an agricultural harvesting machine with at least one adapting device for receiving a front attachment according to the introductory part of claim 1.

An agricultural harvesting machine of this kind is disclosed in DE 198 47 891, where the agricultural harvesting machine is constructed as a forage harvester and the front attachment is a crop-collecting and conveying pick-up. The working components at the front of the harvesting machine take over the crop from the front attachment and are constructed as feed rollers. A reversing device reverses the direction of rotation of the feed components, thus minimizing damage to the working components of the harvesting machine caused by foreign bodies. On operation of the reversing device, the feed rollers convey the crop out of the front region of the harvesting machine and transfer it to the front attachment, which is adapted to the harvesting machine in the front region. In order to avoid blockages or damage in the region of the working components of the front attachment caused by the foreign bodies located in the crop, DE 198 47 891 discloses a control system which ensures that the cross conveying member is always lifted before the reversing device cuts in and the crop interspersed with foreign bodies is conveyed out of the harvesting machine. An essential drawback to this reversing process is that, in addition to the crop, the foreign body or bodies are always conveyed back into the front attachment. Thus, to avoid the foreign bodies being fed into the harvesting machine requires removing the foreign bodies from the front attachment. As a rule this is done by the driver of the harvesting machine by interrupting the harvesting process, leaving the harvesting machine and manually removing the foreign bodies from the front attachment. The desire of the operator to have a reasonable service life for the machine in this case reduces the productivity of the agricultural harvesting machine considerably.

Furthermore there is an increase in the risk of injury to the person removing the foreign bodies, as they must often put their hands between the working components of the front attachment while performing this task.

SUMMARY OF THE INVENTION

In accordance with the present invention an agricultural harvesting machine is disclosed. The harvesting machine includes an adapting device for receiving a front attachment and a mechanically adjustable reversing device which is associated with at least one of a plurality of working components of the agricultural harvesting machine, which are at the front of the harvesting machine, relative to the direction of travel, wherein the front attachment, which is received by the adapting device, is movable by a displacement means into a non-working position which is at a distance from said working components and which forms a gap for passage of crop between the front attachment and said working components.

It is an aspect of the invention to provide an agricultural harvesting machine of the kind generally described hereinbefore, which overcomes the drawbacks of the machines known in the art. This aspect is accomplished particularly due to the fact that in the present invention, the foreign bodies located in the crop stream and conveyed back during reversal no longer pass into the front attachment.

The front attachment, which is received by at least one adapting device of the harvesting machine, is movable by at least one displacement means into a non-working position. This non-moving position is located at a distance from the working components of the agricultural machine, which are at the front of the machine in the direction of travel. This allows for a gap through which crop passes between the front attachment and these working components. The crop stream is conveyed out of the agricultural harvesting machine during the reversing process and is interspersed with one or more foreign bodies that can flow down in the direction of the ground via the through-gap created between the front attachment and the working components of the agricultural harvesting machine. Thus, the foreign bodies conveyed back during the reversing process no longer pass into the front attachment, thereby obviating need to perform the time consuming and dangerous task of manually removing the foreign bodies from the front attachment.

One advantageous preferred embodiment of the invention features a design which is structurally simple and includes a front attachment which can be pivoted into the non-working position about a shaft received by the adapting device of the agricultural harvesting machine. This shaft points transversely to the direction of travel.

In order to be able to continue to support a portion of the weight of the front attachment on the ground while the front attachment is brought into the non-working position, a further advantageous embodiment of the invention features a displacement of the front attachment, relative to the working components of the agricultural harvesting machine.

A structurally simple design of the pivotable front attachment on the agricultural harvesting machine is achieved if the adapting device of the agricultural harvesting machine, which forms the pivot shaft pointing transversely to the direction of travel, is positioned on the top side of the front attachment.

The displacement means which triggers the change of position of the front attachment can advantageously be associated with the front attachment on the top or bottom side, thus providing for a space-saving arrangement.

In a further advantageous embodiment of the invention, the displacement means can be constructed as a single-acting or double-acting lifting cylinder, thus allowing for problem-free integration in the hydraulic circuit already existing on the carrier vehicle.

In another embodiment of the invention, the displacement means can be coupled to the control unit of the reversing device, thus ensuring, in a structurally simple manner, that the front attachment is already pivoted into its non-working position before the reversing process begins. The control unit of the reversing device is activated by an input signal X1 to be triggered by the driver of the harvesting machine. The control unit thereupon automatically generates an output signal Y1 in the form of pressurization of the displacement means and, with time staggering, an output signal Y2 for switching on the reversing device.

In yet another advantageous embodiment of the invention, the displacement means can be formed by an inexpensive single-acting lifting cylinder, wherein the front attachment pivots back from the non-working position into the working position by force of gravity alone. When single-acting lifting cylinders are used, an end-position locking system known in the art can be provided between the front attachment and the agricultural harvesting machine to ensure that the front attachment is reliably fixed upon the agricultural harvesting machine while in the working position.

In order to be able to dispense with an additional end-position locking system, while retaining fixing of the front attachment in the working position, a further advantageous embodiment of the invention includes a displacement means constructed as a double-acting lifting cylinder, which remains continuously under pressure in the working position of the front attachment and ensures that the front attachment is fixed in the working position. Also, a displacement of the front attachment relative to the working components of the agricultural harvesting machine can be achieved in a structurally simple manner by means of double-acting lifting cylinders.

In the interest of minimizing the risk of injury to persons and the wear on the front attachment during the change of position of the front attachment, another preferred embodiment of the invention provides for the ability to shutdown the drive of the front attachment during movement into the non-working position and back. At its simplest, shutdown of the drive of the front attachment is carried out by quick-release coupling systems known in the art and integrated in the drive.

In a further advantageous embodiment of the invention, the need to shutdown the drive during the change of position of the front attachment is eliminated. In this preferred embodiment, at least one telescopic universal drive shaft known in the art is associated with the drive train.

As the aerodynamic trajectory of the crop conveyed out of the agricultural harvesting machine during the reversing process depends substantially on the nature of the crop and the weight of the foreign bodies located therein, an advantageous development of the invention includes, in the rear region of the front attachment, a crop deflector which ensures that crop flies into the front attachment, free of all foreign bodies. In order to assist the crop impinging on the crop deflector to flow down, the crop deflector can be constructed as an angle plate, which is advantageously mounted on the front attachment so as to be releasable and hence easy to exchange as it wears.

BRIEF DESCRIPTION OF THE DRAWINGS

Reference is now made to the drawings, which illustrate the best known mode of carrying out the invention and wherein the same reference characters indicate the same or similar parts throughout the views.

DETAILED DESCRIPTION

Figure 1:
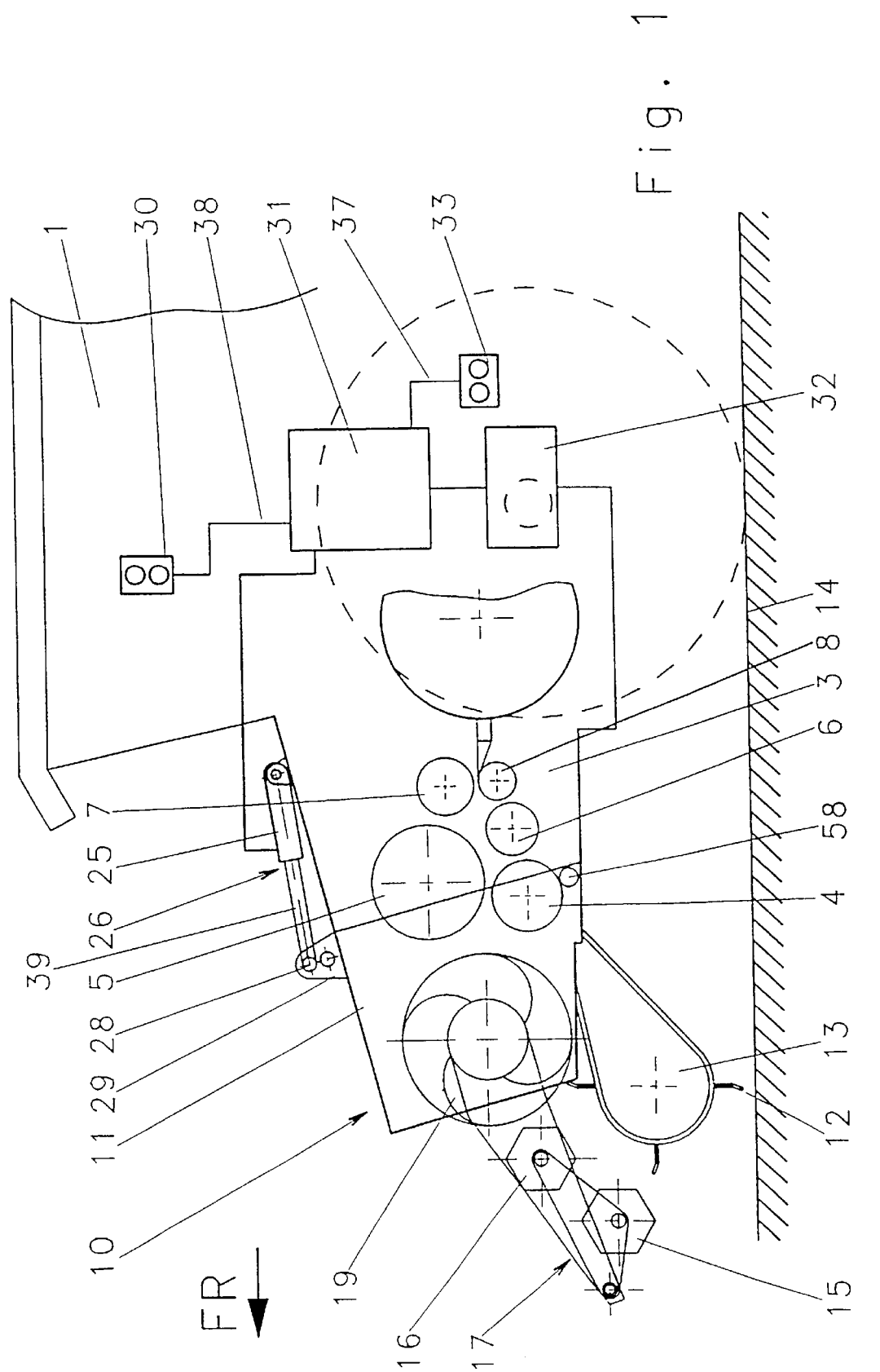
FIG. 1 is a first embodiment of the harvesting machine according to the invention in a side view.

Referring now to FIG. 1, which schematically shows an agricultural harvesting machine 1 which is preferably a forage harvester and which has a feeder housing 3 in its front region and a plurality of feed and compression rollers 4–8. The feeder housing 3 of the agricultural harvesting machine 1 receives a front attachment 10, which is preferably constructed as a pick-up at the front of the harvesting machine, in the direction of travel FR, in a manner according to the invention and described in more detail below. The front attachment 10 in the form of a pick-up is defined by a schematically shown frame 11. On the ground side of the frame 11, a collecting drum 13 which is provided with conveying tines 12 and which, by means of the conveying tines 12, picks up crop lying on the ground 14 and conveys it in overshot fashion, thereby evening out the thickness of the crop mat picked up. The collecting drum 13 is operatively connected to a hold-down frame 17 fixed to the frame 11 in the vertical direction and above the collecting drum 13. If necessary, the connecting drum 13 is adjustable in height and formed by two freely rotatable conveying rollers 15, 16. In the rear region of the conveying rollers 15, 16 and above the collecting drum 13, the front attachment 10 in the form of a pick-up has a cross conveying member 19 which is constructed as a cross auger. The cross conveying member 19 centrally combines the crop picked up by the collecting drum 13 and transfers it in a crop string of smaller width to the working components 4, 5 of the agricultural harvesting machine 1, which are at the front of the machine, in the direction of travel.

Figure 2:
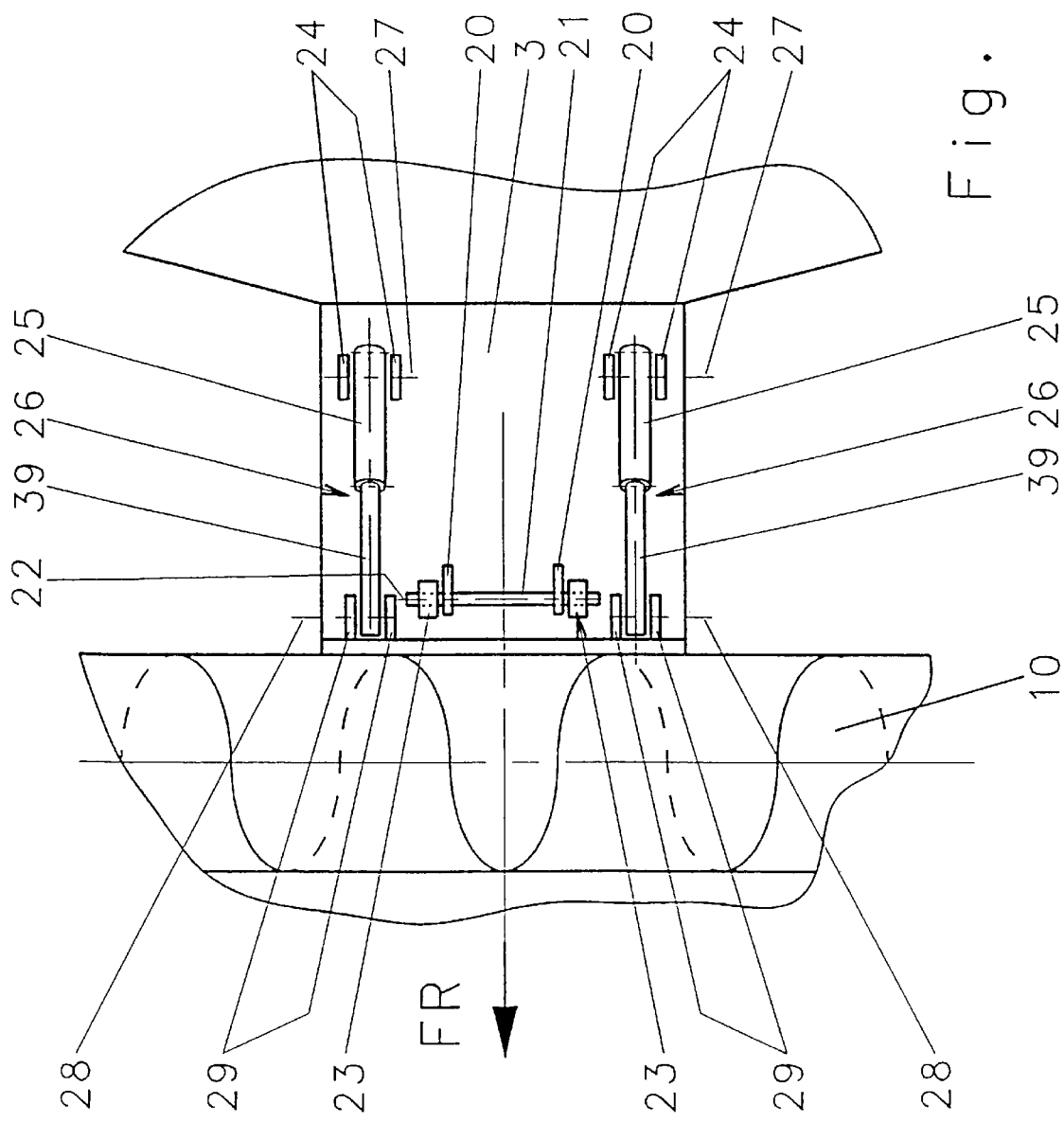
FIG. 2 is a top view of the harvesting machine according to the invention as in FIG. 1

In a first embodiment according to FIGS. 1 and 2, the feeder housing 3 receives, on the top side, mounting flanges 20 through which passes a shaft 22 pointing transversely to the direction of travel FR, which may be simply constructed as a bolt 21. The bolt 21 forming the pivot shaft 22 further passes in its end regions through holding flanges 23 rigidly connected to the front attachment 10 and is, outside these holding flanges 23, prevented from sliding axially in a manner known in the art and therefore not shown in more detail. On the carrier vehicle side, the feeder housing 3 has additional flanges 24 which are rigidly connected to the feeder housing 3 and which, between them, receive the piston end of the displacement means 26 constructed as lifting cylinders 25. Thus, the displacement means 26 is rotatable about a shaft 27 pointing transversely to the direction of travel FR. The piston rod end of the lifting cylinders 25 is received by holding flanges 29 received non-rotatably by the front attachment 10, so that it is rotatable about a shaft 28 also running transversely to the direction of travel FR.

Figure 3:
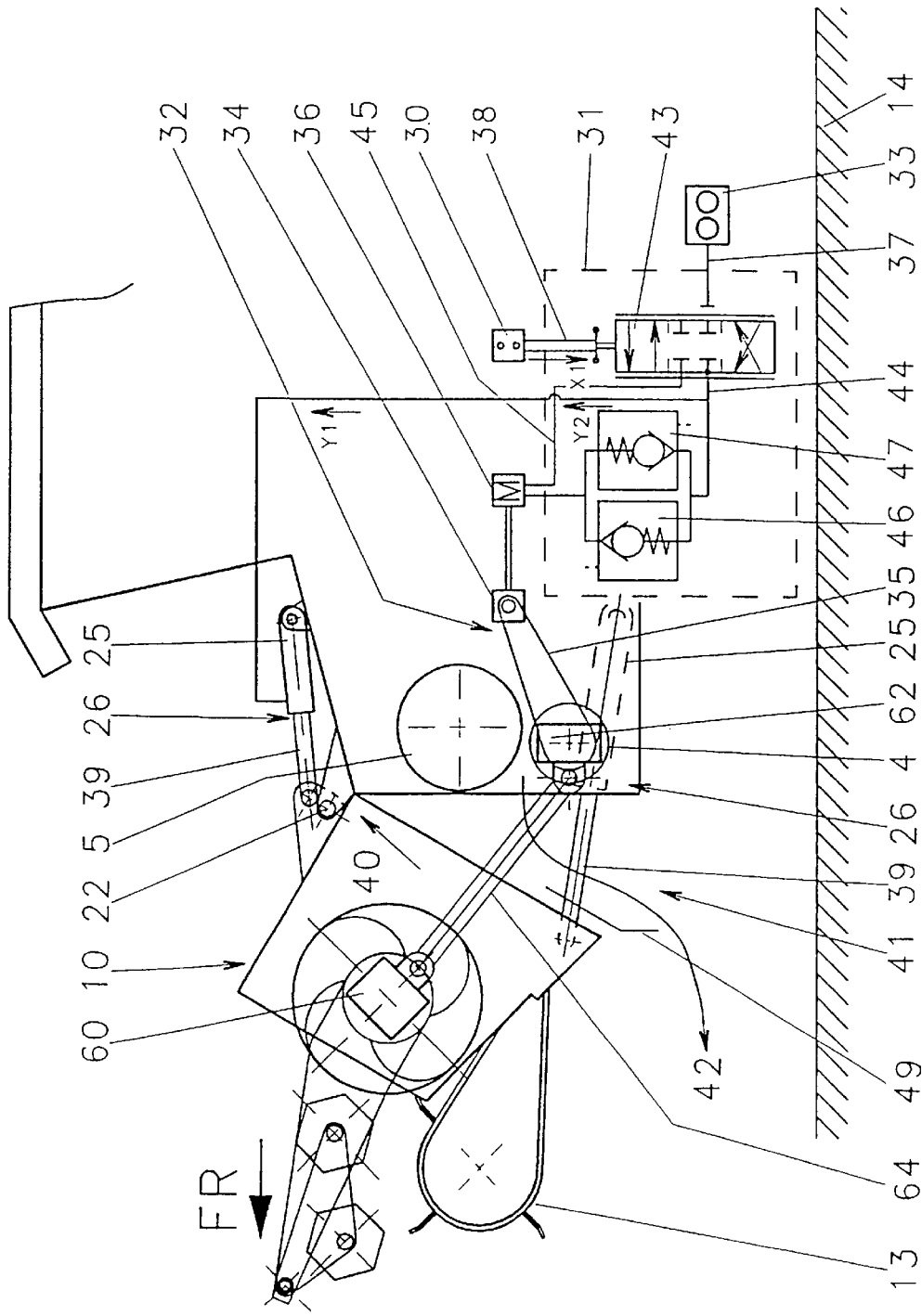
FIG. 3 a detail view of the pivot control of the front attachment as in FIG. 1.

As shown in FIG. 3, the agricultural harvesting machine 1 further includes, in a manner known in the art, switching elements 30 by means of which a control unit 31, which will be described in more detail, can be controlled. In the embodiment shown, the control unit 31 is coupled to a reversing device 32, which will also be described in more detail, thereby providing a means by which the direction of rotation of at least one of the working components 4 of the agricultural harvesting machine 1, at the front of the machine relative to the direction of travel FR, can be reversed. The agricultural harvesting machine 1 also has a hydraulic pump 33 to produce the compressed oil stream.

According to FIG. 3, the reversing device 32 is formed by a reverser gear 34 which is operatively connected by a belt drive 35 to the feed and compression roller 4 at the bottom front, relative to the direction of travel FR, of the harvesting machine. The reverser gear 34 obtains its drive energy from a hydrostatic motor 36. The control unit 31 is connected by line systems 37, 38 to the switching elements 30 and the hydraulic pump 33 of the agricultural harvesting machine 1.

In the working position according to FIGS. 1 and 2, the piston rods 39 of the lifting cylinders 25 are in the extended position, so that the front attachment 10 is mounted directly in front of the working components 4–8 of the agricultural harvesting machine 1 that are at the front of the machine, relative to the direction of travel FR. If now the displacement means 26, constructed as single-acting lifting cylinders 25, is pressurized in a manner which will be described in more detail, the piston rod 39 moves into the respective lifting cylinder 25 and the front attachment according to FIG. 3 pivots into a non-working position about the pivot shaft 22 of the adapting device 40 formed by a bolt 21 and mounting flanges 20. In this non-working position the front attachment 10 occupies such a position relative to the working components 4, 5 of the agricultural harvesting machine 1 which are at the front in the direction of travel, that between the front attachment 10 and these working components 4, 5 forms a gap 41 through which, during reversal of at least the bottom front feed and compression roller 4, the crop conveyed out of the feeder housing 3 in the arrow direction 42 by this feed and compression roller 4 and the feed and compression roller 5 operatively connected to it, passes directly onto the ground 14 without being thrown back into the region of the working components 13, 18 of the front attachment 10. If the displacement means 26 are constructed as single-acting lifting cylinders 25, the front attachment 10 automatically pivots back into the working position shown in FIG. 1 when the pressure of the lifting cylinders 25 is relieved.

In a further embodiment according to the invention only the adapting device 40 can be associated with the front attachment 10 on the top side, while the at least one displacement means 26, as shown in broken lines in FIG. 3, connects the front attachment 10 on the bottom side to the feeder housing 3 of the agricultural harvesting machine 1. Such a construction allows for the use of single-acting lifting cylinders 25 whose piston rod 39 is extended from the lifting cylinder 25 when pressure is applied to pivot the front attachment 10 into the non-working position.

In order to guarantee that the front attachment 10 has always reached its non-working position before the reversing process conveying the crop out of the feeder housing begins, the hydrostatic motor 36 which triggers the reversing process is connected by the above-mentioned control device 31 to the displacement elements 30 and the hydraulic pump 33 of the agricultural harvesting machine 1. The control device 31 has a directional control valve 43 which can be driven via line system 38 by the displacement elements 30 of the agricultural harvesting machine 1. The line system 37, which is associated with the directional control valve 43 on the input side, supplies the compressed oil stream to the hydraulic pump 33. On the output side, a line system 44 is associated with the directional control valve 43. The line system 44 connects the directional control valve 43 to the respective displacement means 26 by a non-return valve combination 46, 47 to the hydrostatic motor 36 of the reverser gear 34. An additional line system 45 couples the directional control valve 43 directly to the hydrostatic motor 36.

To activate the reversing process by means of the control elements 30, an input signal X1 is triggered, which switches the directional control valve 43 to the position shown in FIG. 3 and the compressed oil stream produced by the hydraulic pump 33 passes into the line system 44. This leads to pressurization of the respective displacement element 26, wherein first the front attachment 10 pivots into the non-working position (output signal Y1). After the front attachment 10 has reached the non-working position, the pressure in the line system 44 rises further until the non-return valve 47 opens (output signal Y2) and the hydrostatic motor 36, via the reverser gear 34, triggers the reversing process at the lower feed and compression roller 4. Via line system 45, the energy-transmitting medium can flow back from the hydrostatic motor 36 into the storage tank, not shown. In an additional switch position of the directional control valve 43, the two line systems 44, 45 can be blocked so that the front attachment 10 remains in the non-working position and the drive of the working components 4–8 of the agricultural harvesting machine 1, which are at the front of the machine relative to the direction of travel, is shut down. In a third switch position of the directional control valve 43, the line system 44 is pressureless so that the front attachment 10 pivots back into its working position again by force of gravity alone, while pipe system 45 is pressurized and the working components 4–8 of the agricultural harvesting machine 1 rotate again, drawing in crop material.

To ensure that the crop stream conveyed out of the feeder housing 3 in the arrow direction 42 during reversal is not conveyed back into the front attachment 3 or the pick-up region of the collecting drum 13, a crop deflector 49 may be associated with the front attachment in its rear region 49. The crop deflector 49 is advantageously constructed as an angle plate which is releasably attached to the front attachment 10 in the rear region thereof, so that easy exchange of this crop deflector 49 is possible when wear occurs.

Figure 4:
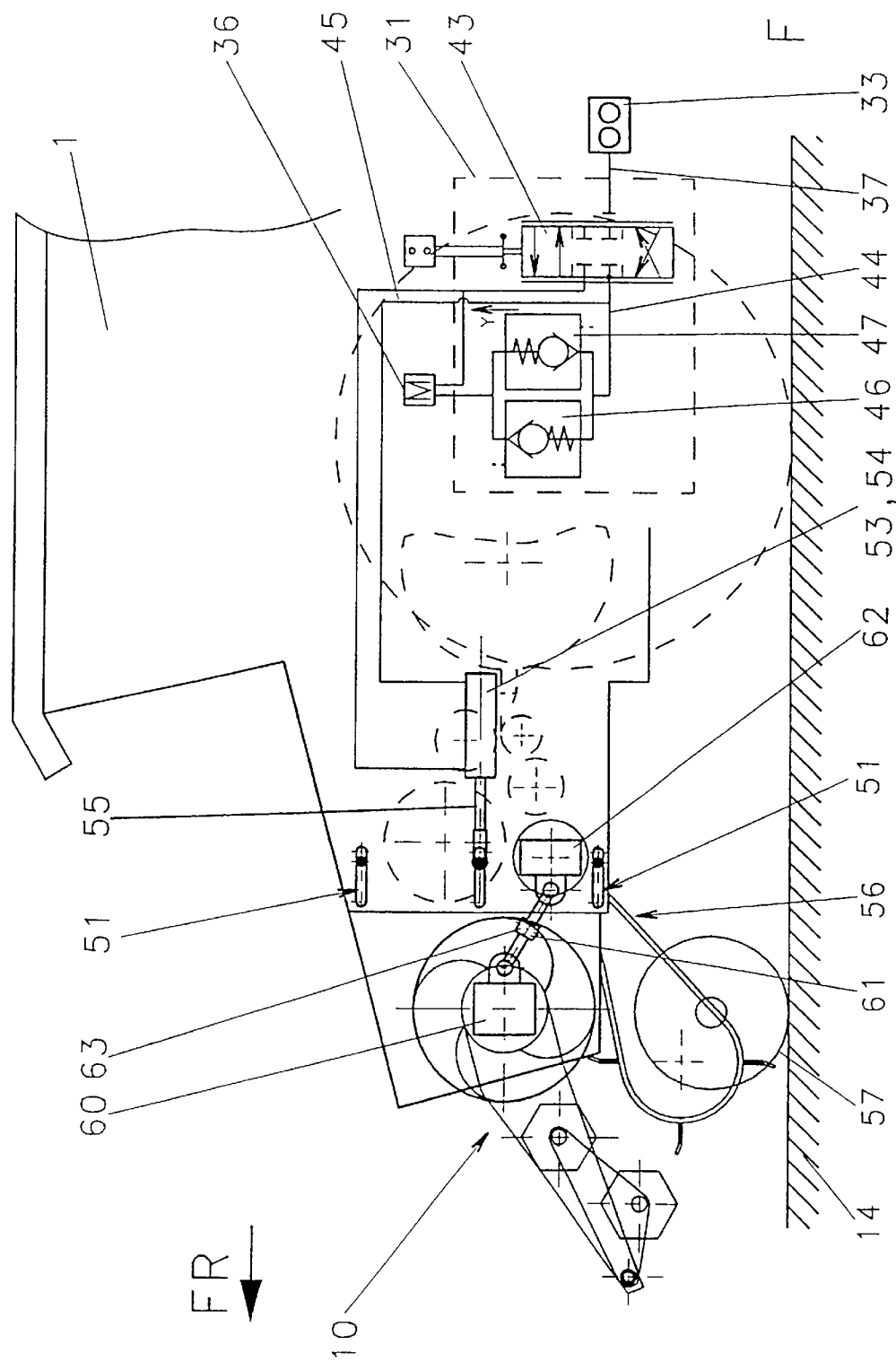
FIG. 4 is a second embodiment of the harvesting machine according to the invention in a side view.

In a further embodiment according to FIG. 4 the adapting device 51 of the agricultural harvesting machine 1 can also be constructed as a sliding joint, wherein the displacement means 53 connects the front attachment 10 to the agricultural harvesting machine 1 at any location and at its simplest is formed by a double-acting lifting cylinder 54. Pressurization of the lifting cylinder or cylinders 54 leads to extension or retraction of the piston rod 55, wherein the front attachment 10 can be moved by means of the adapting device 51 in the form of sliding joints in or counter to the direction of travel FR, thus forming a gap 56 through which the crop stream conveyed out of the feeder housing 3 during reversal does not pass back into the front attachment 10. It is within the scope of the invention that with a construction of this kind a crop deflector 49, 50 as in the design according to FIG. 3 can be associated with the front attachment 10 in its rear region. If the front attachment 10 also has at least one land wheel 57, displacement of the front attachment to reach the gap 56 for passage of crop is particularly advantageous above all because the displacement means 53 and the adapting device 51 does not have to carry the whole weight of the front attachment. Part of the weight can be supported on the ground 14 by the at least one land wheel 57. Due to the fact that line system 45 is now connected to the second connection of the double-acting lifting cylinder 54, the lifting cylinder 54 in the working position can simultaneously assume a locking function between the front attachment and the agricultural harvesting machine 1. This same effect can be achieved, as illustrated in FIG. 2, if the single-acting lifting cylinder or cylinders 25 are replaced by double-acting lifting cylinders 54 as in FIG. 4, and wherein the side of the lifting cylinder 54 which is under pressure in the working position is connected to the line system 45.

It is within the scope of the invention that, when using single-acting lifting cylinders 25 as in FIG. 1, additional mechanical or hydraulic locking elements 58 can be provided which connect the front attachment 10 in the working position in its lower region to the agricultural harvesting machine 1. Mechanical or hydraulic locking elements 58, such as marking bolts or lifting cylinders which are known in the art, and therefore not shown in more detail, can be used for this purpose.

To minimize wear on the front attachment 10 when it is brought into the non-working position, a further embodiment of the invention provides a shutdown of the drive 60 of the front attachment 10. At its simplest this is achieved by connecting the drive 60 of the front attachment 10 by quick-release coupling systems 61 known in the art to a drive gear 62 of the agricultural harvesting machine 1. The engagement elements 63 of the quick-release coupling system 61 are coupled and uncoupled automatically.

To obtain a relatively inexpensive drive design, a further embodiment of the invention provides for the drive 60 of the front attachment 10 to be connected by a telescopic universal drive shaft 64 to an output drive gear 62 of the agricultural harvesting machine, wherein shutdown of the drive of the front attachment 10 does not take place.

It is within the scope of the invention that the front attachment 10 constructed as a pick-up 9 in the practical example can be replaced by any front attachment.

Other objects, features and advantages will be apparent to those skilled in the art. While preferred embodiments of the present invention have been illustrated and described, this has been by way of illustration and the invention should not be limited except as required by the scope of the appended claims.

I claim:

1. An agricultural harvesting machine having a front relative to a direction of travel and a rear, comprising:
   a front attachment having a top side and a bottom side;
   an adapting device for receiving the front attachment;
   a plurality of working components located at the front of said harvesting machine and rearwardly of the front attachment, each working component having a direction of rotation;
   an adjustable reversing device for reversing the direction of rotation for at least one of the plurality of working components; and
   a displacement means for moving the front attachment into a non-working position spaced from said working components, thereby forming a downwardly-facing gap between said front attachment and said working components for discharge of foreign objects in the crop.

2. The agricultural harvesting machine according to claim 1, wherein said reversing device is operatively adjustable by a hydraulic cylinder.

3. The agricultural harvesting machine according to claim 1, wherein the non-working position of said front attachment is reached by pivoting said front attachment about a shaft that is received by said adapting device and points transversely to said direction of travel.

4. The agricultural harvesting machine according to claim 1, wherein said non-working position of the front attachment is reached by displacing said front attachment in a region of said adapting device relative to the working components.

5. The agricultural harvesting machine according to claim 3, wherein said adapting device, which forms said shaft pointing transversely to the direction of travel, is positioned on said top side of said front attachment.

6. The agricultural harvesting machine according to claim 1, wherein said displacement means is connected to said top side of said front attachment.

7. The agricultural harvesting machine according to claim 1, wherein said displacement means is connected to said bottom side of said front attachment.

8. The agricultural harvesting machine according to claim 1, wherein said displacement means includes a single-acting lifting cylinder.

9. The agricultural harvesting machine according to claim 1, wherein said displacement means includes a double-acting lifting cylinder.

10. The agricultural harvesting machine according to claim 1, wherein said displacement means includes a single-acting lifting cylinder and said front attachment is pivoted back from said non-working position into a working position by force of gravity.

11. The agricultural harvesting machine according to claim 10, wherein said front attachment in the working position includes a mechanical end-position locking system.

12. The agricultural harvesting machine according to claim 10, wherein said front attachment in the working position includes a hydraulic end-position locking system.

13. The agricultural harvesting machine according to claim 1, wherein said displacement means includes a double-acting lifting cylinder and said front attachment is moved back from said non-working position into a working position by pressurization of said displacement means and in said working position, said front attachment is fixed in position by continuous pressurization of said displacement means.

14. The agricultural harvesting machine according to claim 1, wherein said front attachment includes a drive which is interrupted during movement into said non-working position.

15. The agricultural harvesting machine according to claim 1, wherein said front attachment includes a drive which is not interrupted during movement into said non-working position.

16. The agricultural harvesting machine according to claim 15, wherein said drive of said front attachment is operatively connected to said front attachment by a telescopic universal drive shaft.

17. The agricultural harvesting machine according to claim 1, wherein a crop deflector is connected to a rear region of said front attachment.

18. The agricultural harvesting machine according to claim 17, wherein said crop deflector is formed by an angle plate releasably mounted on said front attachment.

19. The agricultural harvesting machine according to claim 1, wherein said reversing device is mechanically adjustable.

20. The agricultural harvesting machine according to claim 1, wherein said reversing device is hydraulically adjustable.

21. The agricultural harvesting machine according to claim 1, wherein said reversing device is both mechanically and hydraulically adjustable.

22. The agricultural harvesting machine according to claim 1, wherein said reversing device includes driving means for reversing the direction of rotation for at least one of the plurality of working components.

23. The agricultural harvesting machine according to claim 22, wherein said driving means is a hydraulic motor.

24. An agricultural harvesting machine having a front relative to a direction of travel and a rear, comprising:
   a front attachment having a top side and a bottom side;
   an adapting device for receiving the front attachment;
   a plurality of working components located at the front of said harvesting machine, each working component having a direction of rotation;
   an adjustable reversing device for reversing the direction of rotation for at least one of the plurality of working components;
   a displacement means for moving the front attachment into a non-working position which is at a distance from said working components, thereby forming a gap between said front attachment and said working components for passage of crop and foreign objects; and
   a control unit operatively connecting said reversing device to said displacement means such that an input signal X1 occurring at said control unit automatically triggers a first output signal Y1 for operation of said displacement means and, with time staggering, a second output signal Y2 for operation of said reversing device.

25. The agricultural harvesting machine according to claim 24, wherein operation of said displacement means by output signal Y1 causes movement of said front attachment into said non-working position.

26. An agricultural harvesting machine having a front relative to a direction of travel and a rear, comprising:

a front attachment having a top side and a bottom side;

an adapting device for receiving the front attachment;

a plurality of working components located at the front of said harvesting machine, each working component having a direction of rotation;

an adjustable reversing device for reversing the direction of rotation for at least one of the plurality of working components;

a displacement means for moving the front attachment into a non-working position which is at a distance from said working components, thereby forming a gap between said front attachment and said working components for passage of crop and foreign objects;

said front attachment including a drive which is interrupted during movement into said non-working position; and said drive of said front attachment being operatively connected to said front attachment by a quick-release coupling system.

* * * * *